Sept. 2, 1958     H. A. SHABAKER     2,850,038
FLOW CONTROL DEVICE
Filed Sept. 30, 1952
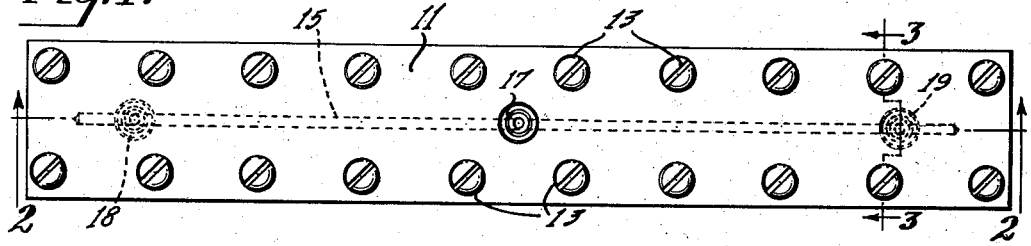
Fig. 1.
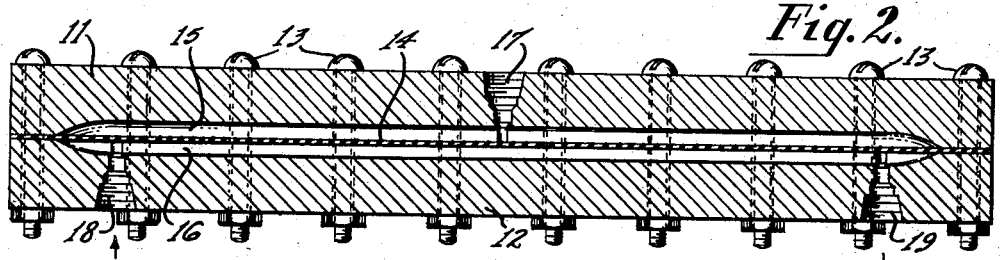
Fig. 2.
Fig. 3.    Fig. 4.
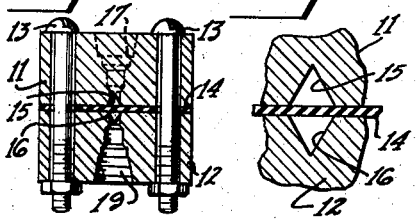
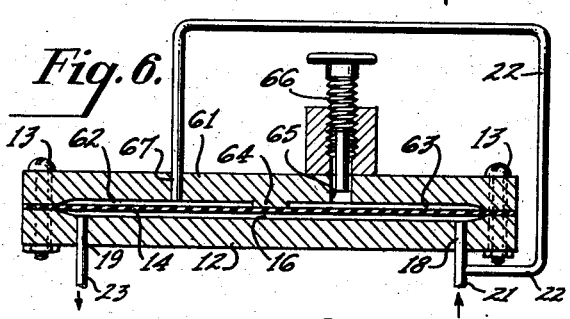
Fig. 6.
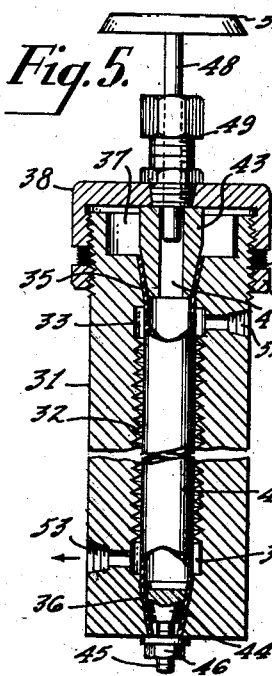
Fig. 5.
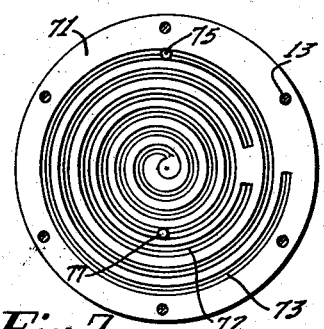
Fig. 7.
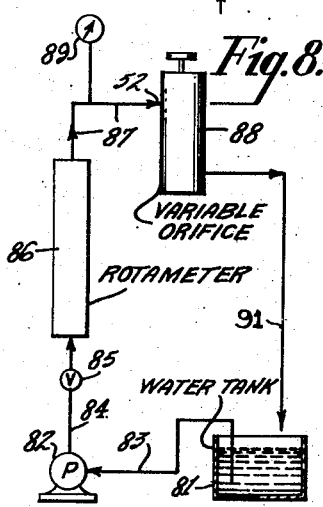
Fig. 8.
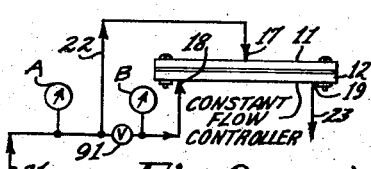
Fig. 9.
INVENTOR
*Hubert A. Shabaker*
BY
*William K. Alexander*
ATTORNEY

United States Patent Office 2,850,038
Patented Sept. 2, 1958

2,850,038

FLOW CONTROL DEVICE

Hubert A. Shabaker, Media, Pa., assignor to Houdry Process Corporation, Wilmington, Del., a corporation of Delaware Application September 30, 1952, Serial No. 312,387

6 Claims. (Cl. 137—505.13)

This invention relates to a method and apparatus for controlling the flow of liquid or gaseous material, particularly as applied to operations wherein a constant low-volume flow is to be maintained, and wherein the nature of the fluid is such as to make impractical the use of conventional control means employing small-diameter orifices and valve ports.

The invention is especially applicable to low-volume feeding of a dispersion or slurry comprising a liquid containing minute solid particles in suspension, an example of such application being found in the manufacture of catalyst beads of the type employed in hydrocarbon conversion processes. A method for catalyst bead manufacture to which the present invention may advantageously be applied is described in U. S. Patent No. 2,487,065 issued on November 8, 1949 to T. H. Milliken, Jr. Apparatus in general for bead catalyst manufacture is described in applicant's prior Patent No. 2,543,132 of February 27, 1951.

In the manufacture of hydrogel beads of the type referred to in the aforementioned patents, a gelable hydrosol is discharged into a liquid setting medium immiscible therewith, wherein the material sets to form the desired bead. As pointed out in the aforementioned patents, the hydrosol is formed by bringing together reactant solutions, one of which may contain a fine powder which is to be incorporated in the sol. The powder is usually of a size less than 50 microns. Because of the fact that the sol sets very rapidly after its formation, it is desirable to bring the reactants together just prior to the deposition of the sol in the setting liquid. This requires a relatively constant low-volume flow of the powder-containing reactant into the mixing zone or chamber.

The powder-containing reactant may comprise, for example, a solution of sodium-silicate containing finely-divided catalyst particles in suspension. The catalyst held in suspension may comprise pulverized catalyst beads which were previously formed and then selectively rejected as being outside the desired particle-size range.

The disadvantage in using gate or needle valve devices for controlling the flow of the solids-containing reactant into the mixing chamber has been their inability to maintain a constant low-volume flow through the highly constricted orifices, without cessation or substantial variation of flow by reason of the pulverized catalyst particles becoming lodged in the orifice opening. Such variation in flow upsets the proportion of the reactant fluids within the reaction zone or chamber, thereby necessitating an interruption of the operation in order to clear the obstruction from the discharge device.

A further disadvantage of devices heretofore employed for feeding the powder-containing reactant into the reaction chamber has been their inability to maintain a constant low-volume flow in the presence of a substantial pressure variation at the source supplying the powder-containing reactant to the flow control device. With the apparatus usually employed in processing operations of the type herein discussed it is relatively difficult to maintain a constant pressure at a source of fluid supply without resorting to complicated or expensive apparatus whose use, for these and other reasons, is not considered practical. However, the problem of operating with a variable pressure at the source of fluid supply to the flow control device becomes especially acute when an extremely low volume of flow through the control device is to be maintained, and when, in addition the fluid contains particles of solid matter.

In accordance with the present invention, a fluid, or a suspension of minute solid particles in a liquid, is caused to flow uniformly at an extremely low rate of flow, despite pressure variations in the fluid supply line, by passing the fluid through an elongated confined path of uniform, restricted flow area having coextensive therewith a resilient confining wall, and by applying to the surface on the opposite side of the resilient confining wall a uniformly distributed pressure of sufficient magnitude to compensate for pressure variations at the fluid source. The pressure applied to the external surface of the resilient portion of the confined path, deforms the resilient portion and constricts the confined path for a substantial portion of its length sufficiently to produce an increase in pressure drop through the confined path which will compensate for the increase in pressure at the fluid source, thereby maintaining a constant flow through the confined path.

In addition to being able to function as a constant-flow controller, irrespective of pressure changes in the fluid supply line, the invention may readily serve as an adjustable valve or restricted orifice by merely using the confined-space on the opposite side of the resilient wall as an hydraulic cylinder. By filling such confined space with a suitable non-compressible fluid, and providing means for applying a constant compressive force to the fluid, the confined flow path for the fluid to be controlled may be constricted throughout the portion containing the resilient wall to produce the desired rate of flow.

In accordance with a preferred embodiment of the invention, elongated channels of substantially identical length and width are formed along the surfaces of separate bar or plate members, and the latter are secured together with the channels in opposed relationship and separated by a resilient diaphragm which is clamped between the bar members. An inlet and an outlet are provided at opposite ends of one channel, so that the fluid whose rate of flow is to be controlled may be passed continuously through the channel. The other channel is provided with a single inlet, through which the channel may be filled with a non-compressible fluid. The inlet to the second channel is connected to suitable means for applying pressure to the non-compressible fluid, so as to cause the latter to deform the resilient diaphragm and displace it toward the first channel. Since there is static fluid in the second channel, and flowing fluid in the first, there will be a progressively increasing pressure differential at opposite surfaces of the diaphragm, in the direction of such flow, thereby producing a progressive constriction of the first channel.

Dependent upon the source of pressure applied to the non-compressible fluid in the second channel, the device may be made to operate in several ways. For example, if the pressure applied to the non-compressible fluid is set at a fixed value, the device will operate as an elongated orifice to control the flow of fluid through the first channel. If the inlet pressure of the fluid supplied to the first channel is not constant, however, and the pressure variation is of such magnitude that the rate of flow through the first channel is seriously affected, compensation may be made for such pressure variation by varying the pressure on the non-compressible fluid in the second channel in accordance with the changes in pressure at the fluid inlet to the first channel. In order that changes in pressure in the fluid supply line leading to the first channel may instantaneously be reflected on the body of non-compressible fluid within the second channel pressure-responsive means known to the art may be employed. When the fluid to be controlled is a non-compressible fluid, the pressure variations in the supply line may be transmitted directly to the second channel by a pressure connection between the latter and the fluid supply line which serves to transmit the pressure variations.

In a further preferred embodiment of the invention, the variable orifice and constant flow control devices may be combined in a single structure by dividing the second channel into two separate sections. The section adjacent to the inlet end of the first channel may then be used as a variable orifice, and the section adjacent to the outlet end may be used as a constant flow controller for the stream of fluid discharging from the first channel.

For a fuller understanding of the invention, reference may be had to the accompanying drawing forming a part of this application, in which:

Fig. 1 is a plan view of one embodiment of the invention;

Fig. 2 is a half-section, in elevation, taken along the line 2—2 of Fig. 1;

Fig. 3 is a sectional view, in elevation, taken along the line 3—3 of Fig. 1;

Fig. 4 is an enlarged fragmentary view of the central portion of Fig. 3 showing the diaphragm-separated channels;

Fig. 5 is a sectional view, in elevation, showing a modification of the device, especially adapted for use as a variable orifice;

Fig. 6 is a sectional view, in elevation, showing a modification of the device illustrated in Figs. 1–4, in which the device is made to function as both a variable orifice and a constant flow controller;

Fig. 7 shows a modified form of the device illustrated in Fig. 6, a plan view of but one of the connected plate members being shown;

Fig. 8 is a diagrammatic illustration of an arrangement of apparatus employing the embodiment of the invention illustrated in Fig. 5; and Fig. 9 is a flow diagram for the embodiment of the invention illustrated in Figs. 1–4.

Referring to Figs. 1–4 of the drawing, the flow control device comprises a pair of elongated bar or plate members 11 and 12, of rectangular cross section, rigidly secured with their broadest surfaces together by a peripheral row of bolts 13. A resilient diaphragm 14, formed of rubber, plastic, or other suitable resilient material, is clamped between the opposed faces of bars 11 and 12.

Each of the bars has a longitudinal V-shaped groove formed centrally along one face, and terminating just short of each end of the bar. The grooved portions are placed in opposed relationship on opposite sides of the resilient diaphragm 14, thereby forming separate adjacent confined channels 15 and 16 in the bars 11 and 12, respectively. Channel 15 is provided with an inlet 17 located centrally between its ends, and extending through the bar 11 from the outer face. Opening 17 is adapted to receive a pipe fitting, so that a non-compressible fluid may be supplied through the inlet 17 to the chamber formed by channel 15. Channel 16 is provided with an inlet 18 at one end and an outlet 19 at the other end, each extending through the bar 12 from the outer face, and each adapted to receive a pipe fitting, so that the fluid may be passed continuously through the passage formed by channel 16. The diaphragm 14 is of such construction that, while it may readily be deformed or deflected by the application of a relatively small pressure on either side representing the differential pressure between the channels, it will normally provide a straight partition or wall separating chamber 15 and passage 16.

Although any suitable cross-sectional configuration may be used for one or both of the channels 15 and 16, the V-shaped channel, clearly illustrated in Fig. 4, is preferred, since it provides a path of regular cross section whose flow area will be subjected to a maximum constriction for a given deformation or deflection of the wall formed by the diaphragm.

Chamber 15 is filled with a non-compressible fluid, which may be different from or identical with the fluid which is to be passed through passage 16. Furthermore, in certain applications of the invention, to be hereinafter explained, chamber 15 and passage 16 may be connected to a common fluid source.

In order that the invention may be especially applicable for use in maintaining a constant low-volume flow of fluid containing minute particles of solid matter in suspension, such as a hydrogel slurry employed in catalyst manufacture, passage 16 is of relatively small cross-sectional flow area. The flow area of passage 16 is large enough to permit free passage at low velocity flow of the solid particles carried in suspension in the liquid, while at the same time being small enough to introduce an appreciable pressure drop on the fluid stream flowing through the passage. Since the fluid in chamber 15 is non-compressible, pressure applied thereto is transmitted uniformly over the portion of diaphragm 14 which confines the fluid, thereby tending to displace the resilient wall. The degree of displacement at any point, however, is dependent upon the pressure differential between opposite sides of the wall. Since there is a pressure drop when fluid flows through passage 16, there will be a progressive increase in the pressure differential between chamber 15 and passage 16, thereby displacing diaphragm 14 into passage 16 and effecting a uniform constriction of the flow area of the latter throughout its length. As thus constricted, passage 16 will impose a greater pressure drop on the fluid stream flowing through the passage. The change in pressure drop for a stream of fluid flowing through passage 16 will vary directly with changes in pressure applied to the static body of non-compressible fluid contained in chamber 15.

The invention may be employed either as a constant low-volume flow controller, or as a variable orifice for controlling fluid flow. In its simplest application, that is, as a variable orifice, inlet 17 is connected to any conventional means for applying an adjustable fixed pressure on the non-compressible fluid in chamber 15. The amount of deflection of the diaphragm 14 will in such case vary directly with the amount of pressure applied on the fluid. As the diaphragm 14 is deflected into passage 16 by the increase in pressure applied to the non-compressible fluid in chamber 15, the cross-sectional flow area of the passage 16 is reduced, the amount of such reduction being dependent upon the amount of pressure applied to the fluid in chamber 15. Thus, passage 16 functions as an elongated variable orifice, the rate of flow through the orifice being determined by the degree of constriction of the passage.

When the invention is to be employed as a constant low-volume flow controller, the arrangement of apparatus and connecting conduits may be used as shown in Fig. 9, wherein the fluid whose flow is to be controlled, such as slurry, is supplied through conduit 21. Conduit 21 is connected directly to the inlet 18 of passage 16. A conduit 22 provides a pressure connection between conduit 21 and inlet 17 to transmit the pressure in line 21 to the chamber 15, shown in Fig. 2. From line 21 the fluid enters passage 16 of the bar member 12, and is discharged at the opposite end thereof through outlet 19. The discharged fluid is then conveyed by conduit 23 to the mixing head, not shown, at a substantially constant rate.

When the device is used to control the flow of a hydrogel-forming solution or slurry, as in the manufacture of bead catalyst, conduit 23 may be connected to the means for introducing the solution or slurry into the reaction zone wherein the hydrosol is formed. Since the fluid in lines 21 and 22 are both susceptible to pressure variations occurring at the slurry source connected to conduit 21, any change in pressure at the source will immediately be reflected in both the chamber 15 of bar 11 and the passage 16 of bar 12. The diaphragm 14 separating chamber 15 and passage 16 is so arranged as to cause constriction of the passage 16 whenever the pressure in line 21 is increased. Such constriction causes passage 16 to take a greater portion of the total pressure drop through the entire feed line. Therefore, by constructing the device so that an increase in pressure at the source will be fully compensated for by a corresponding increase in pressure drop through passage 16, the flow of fluid through the system may be maintained substantially constant.

Referring to Fig. 5 of the drawing, the invention is shown in a modified form adapted for use as a variable orifice. The device illustrated in Fig. 5 is especially suitable for the feeding of a liquid slurry containing minute particles of solid matter, or similar fluid of such nature as to make it difficult to feed as an extremely slow-moving stream through conventional orifice valves.

The device comprises an elongated cylindrical member 31 having a central bore extending axially through the member. The bore of member 31 comprises an intermediate threaded portion 32; upper and lower circumferential channels 33 and 34, respectively, at the ends of the threaded portion; and upper and lower tapered portions 35 and 36, respectively, adjacent the outer ends of the channels. The lower tapered portion 36 extends from the lower side of circumferential channel 34 to the lower end of the member 31, and converges inwardly toward its axis. The upper end of the cylindrical member 31 is provided with a relatively wide and deep longitudinal recess 37. A valve bonnet 38 is mounted by a threaded connection on the upper end of the member 31, and is secured thereto by a lock nut 39. A suitable packing 41 is provided between the bonnet 38 and the lock nut 39.

The upper tapered portion 35 of the bore extends from the bottom of recess 37 downwardly to the upper side of circumferential channel 33, and converges downwardly and inwardly toward the axis of the member 31.

A resilient tubular sleeve 42 is placed within the bore of member 31. The sleeve extends from the lower end of the member 31 to the bottom of recess 37, and is of such external diameter as to press snugly against the threaded portion 32 of the bore. The resilient sleeve is rigidly secured at its upper and lower ends to the tapered portions 35 and 36 by tapered plugs 43 and 44, respectively. The lower tapered plug 44 has an axial threaded extension 45 projecting downwardly beyond the lower end of member 31. A nut 46 mounted on the projecting end of the threaded extension 45 permits the tapered plug 44 to be drawn downwardly so as to clamp the lower-end portion of the resilient sleeve 42 against the tapered portion 36 of the bore. The upper tapered plug 43 extends upwardly beyond the upper end of cylindrical member 31 and is engaged by the under-surface of bonnet 38, the latter being screwed downwardly on the threaded end of member 31 to force the plug 43 into the tapered portion 35 of the bore. Sufficient pressure is applied to tapered plugs 43 and 44 to rigidly secure the resilient member 42 in a fluid-tight seal at both ends. Upper tapered plug 43 is drilled axially to provide an opening 47 adapted to receive the lower end of a valve stem 48 set in the bonnet 38 and secured thereto by a conventional gland assembly, generally indicated at 49. A handwheel 51 on the upper end of valve stem 48 permits the valve stem to be manually raised or lowered so as to change the volume of the combined hollow space within the resilient member 42 and the drilled upper plug 43.

The hollow space is filled with a non-compressible fluid, so that a movement of the valve steam 48 downwardly into the hollow space applies a substantial pressure over the entire inner-wall surface of the resilient tubular member 42. Such pressure applied to the inner wall of member 42 deforms the resilient tube, causing it to be displaced laterally into the helical groove formed by the threaded portion 32, thereby substantially constricting the flow area within the threaded portion.

A fluid inlet 52 is provided in the side of member 31 near its upper end. Inlet 52 communicates with circumferential channel 33, and is adapted to receive a pipe fitting. A fluid outlet 53 is similarly provided adjacent the lower end of member 31 in open communication with channel 34. Fluid introduced into channel 33 passes downwardly along the confined helical path defined by the threaded portion 32 and the outer surface of the resilient diaphragm 42 to the channel 34, and is discharged from the channel 34 through outlet 53. The helical path is in effect an elongated adjustable orifice, the rate of fluid flow through the path being determined by the degree of displacement of diaphragm 42 into the helical groove as a result of pressure applied by the valve mechanism to the non-compressible fluid within the hollow diaphragm. As the lower end of the valve stem is fed downwardly into the hollow space it exerts sufficient pressure upon the non-compressible fluid therein to push the diaphragm into the helical path and reduce the flow area of the latter along its entire length. The pressure drop through the helical path caused by the passage of fluid is thereby increased and the flow of fluid is reduced accordingly.

Figs. 6 and 7 show the invention used as a combination flow controller and variable orifice. In Fig. 6, which is intended to be somewhat diagrammatic, the bar member 11 is modified, and its counterpart is designated by the numeral 61. In this form of the invention, the V-shaped groove or channel formed in the face of bar 61 is discontinuous, one portion 62 of the groove forming a chamber having a function similar to that of groove 15 of Fig. 1, and the other portion 63 forming a chamber having a function similar to that of the hollow space in resilient member 42 of Fig. 5. A central sealing partition 64 separates grooves 62 and 63 and is in sealing engagement with diaphragm 14. Groove 63 is provided with an inlet 65 through which a non-compressible fluid is supplied to the groove. A valve mechanism, generally indicated by the numeral 66, has a plunger which, as it is advanced into the opening 65, exerts a force on the non-compressible fluid. The force is transmitted by the fluid to the portion of diaphragm 14 adjacent to groove 63, thereby displacing such portion of the diaphragm into the groove or passage 16 through which the flow of fluid is to be controlled.

Thus, the portion of passage 16 opposed to chamber 63 forms a variable orifice for determining the flow of fluid into the portion of passage 16 opposed to chamber 62. Chamber 62 is also filled with a non-compressible fluid through an inlet 67. When subjected to pressure, the fluid displaces that portion of diaphragm 14 adjacent to chamber 62 into the passage 16, thereby increasing the pressure drop to be taken through the remaining portion of passage 16.

Fig. 7 shows a modified form of the apparatus shown in Fig. 6. Instead of elongated bar members, such as 61 and 12, being employed, the grooves which form the counterparts of pressure chambers 62 and 63 and of fluid passage 16 are cut as left and right helices in the faces of opposed circular plate members. Only one plate member 71, the counterpart of bar 61, is illustrated in the drawing. The illustration, supplemented by the present description, is believed sufficient to enable anyone skilled in the art to make and use the device.

Circular plate member 71 is provided with a circumferential row of holes by which it may be secured, as by bolts 13, to the opposite plate member. The helical groove in plate member 71 is discontinuous. The inner half portion 72, which is the counterpart of groove 62, is provided with a central inlet 77 for the admission of non-compressible fluid, and the outer half portion 73, which is the counterpart of groove 63, is provided with an inlet 75 for the same purpose. The diaphragm is in sealing engagement with plate 71 in the region between the adjacent ends of groove portions 72 and 73, which region corresponds to the sealing partition 64 of Fig. 6. The oppositely turned helical groove in the complementary circular plate member is continuous, and, when a circular resilient diaphragm is clamped between the plate members, it provides a continuous passage for the fluid whose flow is to be controlled.

Experimental investigation to determine the degree of control upon fluid flow which may be effected by the present invention was carried out in the arrangements of apparatus diagrammatically illustrated in Figs. 8 and 9.

In the first experiment, flow tests were made on a variable orifice device similar to that shown in Fig. 5. The arrangement of apparatus for such tests is diagrammatically shown in Fig. 8. It comprises a circulatory system which includes a tank of water 81 as the fluid source. A pump 82 withdraws the water from the tank 81 through conduit 83 and causes it to flow through the remaining portions of the system. From pump 82 the water is conveyed through conduit 84, under the control of a valve 85, to the inlet of a rotameter 86. From the discharge end of the rotameter 86 the water is conveyed through a conduit 87 to the inlet 52 of the variable orifice 88. A pressure gauge 89 is attached to conduit 87 in order to measure the inlet pressure of the variable orifice. The water is discharged from orifice 88 through outlet 53, and is conveyed by conduit 91 back into the water tank 81. Castor oil was employed as the displacement fluid in a rubber tube of approximately 1/16 inch wall thickness. The displacement rod diameter was 0.25 inch, and the maximum travel was 0.75 inch. The following table sets forth the rate of flow through the orifice at various inlet pressures for several settings of the displacement rod:

Table I

| Amount of advancement of displacement rod | Gauge pressure (lbs./sq. in.) | | | | |
|---|---|---|---|---|---|
| | 90 | 70 | 50 | 20 | 10 |
| None............cc.. | 1,000 | 977 | 932 | 795 | 512 |
| Half distance....cc.. | 977 | 955 | 910 | 772 | 454 |
| Full distance....cc.. | 955 | 932 | 888 | 750 | 454 |

In a further similar test, using a displacement rod of 1/2 inch diameter, having a maximum travel distance of 2 1/4 inches requiring 40 turns of the hand-wheel, mercury was employed as the displacement fluid. The following data were obtained:

Table II

| Number of turns advancement of displacement rod | Gauge pressure (lbs./sq. in.) | | | |
|---|---|---|---|---|
| | 85 | 65 | 45 | 25 |
| 0............cc.. | 932 | 910 | 865 | 750 |
| 5............cc.. | 887 | 865 | 818 | 705 |
| 10...........cc.. | 818 | 795 | 750 | 636 |
| 15...........cc.. | 728 | 705 | 660 | 546 |
| 20...........cc.. | 613 | 590 | 546 | 432 |
| 25...........cc.. | 500 | 477 | 432 | 318 |
| 30...........cc.. | 364 | 340 | 295 | 205 |
| 35...........cc.. | 228 | 205 | 160 | 92 |

In Tables I and II the flow of water through the variable orifice has been expressed in terms of cubic centimeters/minute. The data shows that through a wide range of practical operating pressures at the orifice inlet, there is obtained a high degree of flow control. A highly efficient control is maintained, despite the fact that the orifice is set for extremely low-volume flow. Notwithstanding the fact that there is a low volume of flow, the orifice is at all times capable of passing solid particles with the fluid, since there is no highly constricted point along the flow path through the device.

In additional tests, using a flow control apparatus similar to that illustrated in Figs. 1–4, it was demonstrated that with zero outlet pressure and a pressure drop through passage 16 in the order of about 20–50 lbs./sq. in. the flow of fluid remained relatively constant, with a slight decrease in flow at pressure drops in excess of about 50 lbs./sq. in. In other words, within the above-mentioned pressure-drop range there was no substantial variation in the rate of fluid discharge from passage 16 despite pressure variations at the inlet to the passage, such as might occur where the pressure at the fluid source is not maintained at a constant value.

Flow control in accordance with the present invention is of substantial advantage in the handling of slurries or fluids containing minute foreign solid particles, in that there are no small diameter orifices or valve ports which might become clogged with the foreign solids. Such control is of especial advantage when flow rates in the order of up to about 5 gal./min. are being handled.

Obviously many modifications and variations of the invention as hereinbefore set forth may be made without departing from the spirit and scope thereof, and therefore only such limitations should be imposed as are indicated in the appended claims.

What is claimed is:

1. Apparatus for controlling the flow of fluid comprising a plate member having an extended flat surface provided with an elongated groove, a second plate member having an extended flat surface provided with a similar elongated groove but having a transverse partition at an intermediate location between its ends, a resilient diaphragm positioned between said plate members, said diaphragm being in sealing engagement with the upper edge surface of said partition, means for securing said plate members in tightly clamped engagement with said diaphragm in the region surrounding said grooves, means for introducing fluid into one end of said first groove, means for removing fluid from the opposite end of said first groove, means for introducing fluid into said second groove on both sides of said partition, and means for applying pressure to each of the bodies of fluid contained in said second groove on either side of said partition.

2. Apparatus as defined in claim 1, in which said grooves extend in a straight line.

3. Apparatus as defined in claim 1, in which said grooves extend along a spiral line.

4. A variable orifice, low-volume flow control device for controlling continuous liquid flow under varied pressure conditions comprising: a rigid member having along its surface an elongated groove formed by a pair of flat sides intersecting each other at an acute angle; a resilient diaphragm member covering said groove and arranged in fluid-tight connection with said surface so as to define with the walls of said groove an elongated flat-sided confined path for said continuously flowing fluid, the angularity of said groove being such that inward deformation of the resilient wall of said confined path cannot completely seal off the flow of fluid along said path; fluid inlet and outlet means at the ends of said confined path; means for maintaining a confined body of non-compressible fluid in contact with the opposite side of said diaphragm member along the entire surface portion thereof covering said groove; and means for applying pressure to said confined body of non-compressible fluid so as to deform said diaphragm member by displacement thereof into and along the entire length of said groove, said displacement being effective only to constrict said path while maintaining continuous flow of fluid therethrough.

5. Apparatus as defined in claim 4, in which said rigid member is cylindrical and said groove is formed as a helix along its inner surface, and in which said resilient diaphragm member is a flexible tube fitted into the bore of said cylindrical member.

6. Apparatus as defined in claim 4, including pressure transmitting means responsive to variations in pressure at said fluid inlet means and adapted to transmit the changes in pressure to said confined body of non-compressible fluid to thereby effect a deformation of said diaphragm.

References Cited in the file of this patent

UNITED STATES PATENTS

| | | |
|---|---|---|
| 569,781 | Brown, Jr. et al. | Oct. 20, 1896 |
| 1,784,609 | Moulder | Dec. 9, 1930 |
| 2,227,537 | Dasher | Jan. 7, 1941 |
| 2,360,873 | Grove | Oct. 24, 1944 |
| 2,506,152 | Hunter | May 2, 1950 |
| 2,511,733 | Morrison | June 13, 1950 |
| 2,582,917 | Aagaard | Jan. 15, 1952 |
| 2,587,188 | McFadden | Feb. 26, 1952 |
| 2,590,215 | Sausa | Mar. 25, 1952 |
| 2,796,886 | Whitlock | June 25, 1957 |